United States Patent [19]
Takeda et al.

[11] 3,932,889
[45] Jan. 13, 1976

[54] MAGNETIC RECORDING AND REPRODUCING SYSTEM HAVING AN AUTOMATIC TAPE DRIVE CONTROL FUNCTION

[75] Inventors: Kiyoshi Takeda, Neyagawa; Toshiomi Yabu, Kyoto, both of Japan

[73] Assignee: Matsushita Electric Industrial Co., Ltd., Osaka, Japan

[22] Filed: Oct. 24, 1973

[21] Appl. No.: 409,096

[30] Foreign Application Priority Data

| | | |
|---|---|---|
| Oct. 27, 1972 | Japan | 47-108136 |
| Oct. 27, 1972 | Japan | 47-108137 |
| Oct. 27, 1972 | Japan | 47-108138 |
| Oct. 27, 1972 | Japan | 47-108139 |
| May 10, 1973 | Japan | 48-55138[U] |

[52] U.S. Cl. ............ 360/71; 360/72; 360/74; 360/95
[51] Int. Cl.² .......... G11B 15/18; G11B 15/66
[58] Field of Search ......... 360/71, 74, 85, 95, 72; 242/188, 195, 198

[56] References Cited
UNITED STATES PATENTS

| | | | |
|---|---|---|---|
| 3,758,009 | 9/1973 | Magahiro et al. | 242/195 |
| 3,788,571 | 1/1974 | Finster et al. | 360/95 |

*Primary Examiner*—Robert S. Tupper
*Attorney, Agent, or Firm*—Stevens, Davis, Miller & Mosher

[57] ABSTRACT

A magnetic recording and reproducing system using a one-reel catridge tape, which is provided at its leading end with a leader tape wider and more rigid than the magnetic tape and wound on a supply reel accommodated in a protective case, the tape being automatically loaded with the leader tape guided to a take-up reel through a leader tape guide having a slit extending in the direction of tape travel and wider than the magnetic tape but narrower than the leader tape. The system is provided with an automatic tape drive control circuit for effecting sequential control of the tape drive in various timings such as when commencing the loading of the tape, at the end of the tape loading, upon detection of the trailing end of the magnetic tape and at the end of the rewinding. Further, there is provided means for preventing the malfunctioning of the system in case trouble occurs in the tape progress detection means.

6 Claims, 15 Drawing Figures

MAGNETIC RECORDING AND REPRODUCING SYSTEM HAVING AN AUTOMATIC TAPE DRIVE CONTROL FUNCTION

This invention relates to improvements in magnetic recording and reproducing systems of the type capable of automatic operation.

In the recent magnetic recording and reproducing systems, particularly video tape recorders, there has been a trend of using cartridge tapes and cassette tapes, and there have been proposed various electric control circuits for controlling automatic loading mechanisms in these systems.

A first object of the invention is to add to the magnetic recording and reproducing system using a one-reel cartridge tape, which is provided at its leading end with a leader tape and wound on a supply reel accommodated in a protecting case, an automatic tape drive control circuit for automatically controlling the system from the loading of the tape till the ejection of the cartridge.

A second object of the invention is to provide a magnetic recording and reproducing system, which is provided, in addition to the afore-mentioned automatic tape drive control function, with such novel functions as automatic repeating of the reproduction and still reproduction.

A third object of the invention is to provide a magnetic recording and reproducing system, which is provided with means for preventing the malfunctioning of the control circuit when trouble takes place in the tape progress detection means consisting of a lamp and a photoelectric converting element, the detection means being provided on the path of travel of the magnetic tape for detecting the trailing end thereof. When the lamp happens to burn out, the detection of the trailing end of the tape is no longer possible. Accordingly, means is provided for detecting the burn-out of the lamp, its output being fed back to the control circuit to thereby prevent the malfunctioning thereof.

By incorporating the control circuit according to the invention, it is possible to obtain a magnetic recording and reproducing system of a one-reel cartridge type, which is versatile in operability, free from malfunction and capable of entirely automatic operation.

The above and other objects, features and advantages of the invention will become clear when the specification is read in conjunction with the accompanying drawings, in which.

With the magnetic recording and reproducing system using a one-reel cartridge tape for recording and reproduction, the commencement of feeding of the tape from the cartridge, recording or reproduction, stopping and rewinding of the tape and ejection of the cartridge can all be caused under automatic control.

With the magnetic recording and reproducing system using one-reel cartridge tape by loading the cartridge the transparent leader tape leading the magnetic tape automatically starts to be paid off in a fast feed state to be promptly taken up on a take-up reel. Then, upon detection of the leading end of the magnetic tape the tape drive is automatically stopped or rendered into the playback state. The tape progress in the playback state or fast feed state can be automatically stopped or switched into the rewind state in response to the detection of a transparent trailer tape trailing the magnetic tape. At the end of rewinding when the transparent leader tape leading the magnetic tape is completely rewound into the cartridge, the cartridge is automatically ejected. With the above automatic tape drive control the tape is thus subjected to totally automatic control without any manual control operation by merely loading the cartridge, the loading of the leader tape automatically commencing with the loading of the cartridge, the playback state being automatically brought about upon detection of the leading end of the magnetic tape, the rewind state being automatically brought about upon detection of the trailer tape trailing the magnetic tape, and the tape run being automatically stopped upon completion of the rewinding of the leader tape into the cartridge, followed by automatic ejection of the cartridge.

The invention will now be described in conjunction with a preferred embodiment thereof with reference to the accompanying drawing.

Figure 1:
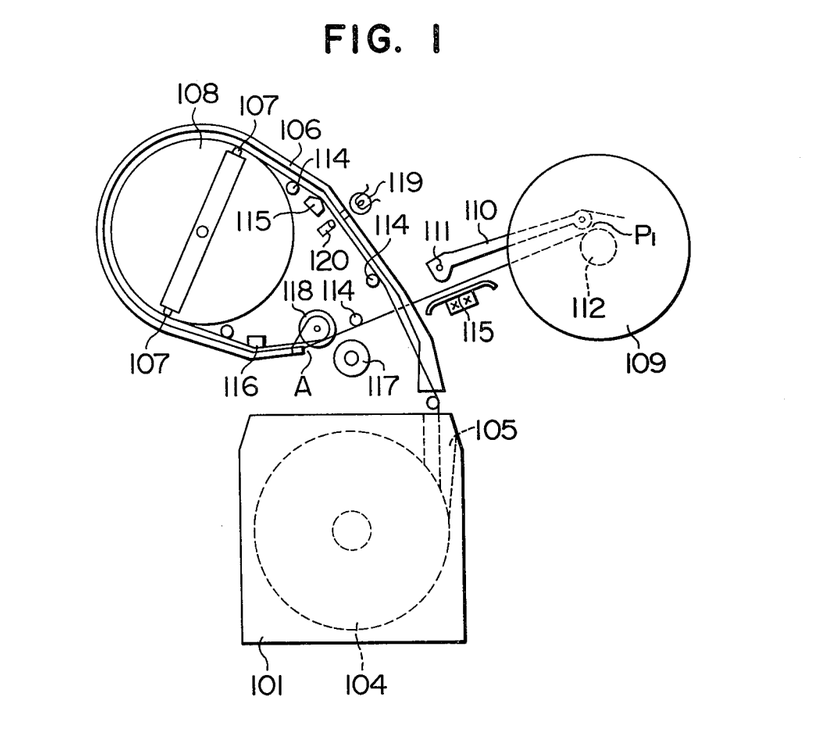
FIG. 1 is a schematic representation of the mechanical arrangement of various parts of a one-reel cartridge type magnetic recording and reproducing system together with a showing of the path of travel of the magnetic tape.
Figure 2:
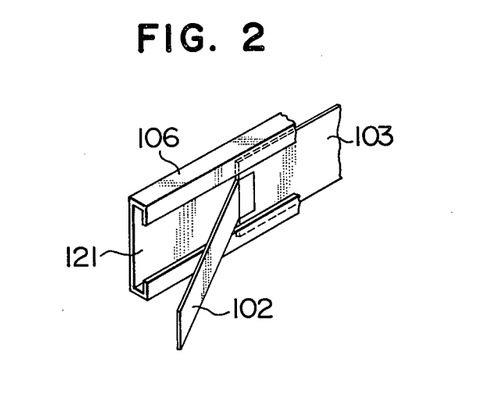
FIG. 2 is a fragmentary perspective view showing a leader tape guide in the arrangement of FIG. 1.

FIG. 1 shows an example of the mechanical arrangement providing the path of tape travel. Referring to the Figure, reference numeral 101 designates a cartridge accommodating a supply reel 104, on which is wound a magnetic tape 102 (FIG. 2) provided at its leading end with a leader tape 103 wider than the magnetic tape and having some rigidity. Numeral 106 designates a leader tape guide. As shown in FIG. 2, it is formed on its one side with a slit extending through its entire length and wider than the magnetic tape 102 but narrower than the leader tape 103. It is disposed such that its one end is positioned near a tape guide opening 105 formed in the cartridge, and it defines a roughly circular path of travel of tape along a cylindrical tape guide 108.

Numeral 106 defines a take-up reel, and numeral 110 a take-up lever pivotable about a support pin 111 and adapted to be urged against a core 112 of the take-up reel 109.

A substantially straight tape travel path is provided between the point $P_1$ of forced contact between the tape roll on the core 112 and the take-up lever 110 and the corresponding end A of the leader tape guide 106.

The leader tape 103 paid off through the tape guide opening 105 proceeds through the space inside the leader tape guide 106, and emerging from the end A of the leader tape guide it proceeds past part of the leader tape guide 106 and a guide plate to the position of the point of contact between the core 112 and take-up lever 110 and is progressively taken up on the core 112 by well-known means.

Numeral 114 designates a guide pin for guiding the magnetic tape 102 coming out of the leader tape guide 106, numeral 115 an erasing head, and numeral 116 a sound and control signal head. Numerals 117 and 118 respectively designate capstan and pinch roller, which are adapted to be urged against each other only in the recording or playback state. Numerals 119 and 120 respectively designate a lamp and a photoelectric converting element, and they constitute a detector for detecting the presence of the magnetic tape in the path of travel of tape.

Figure 3:
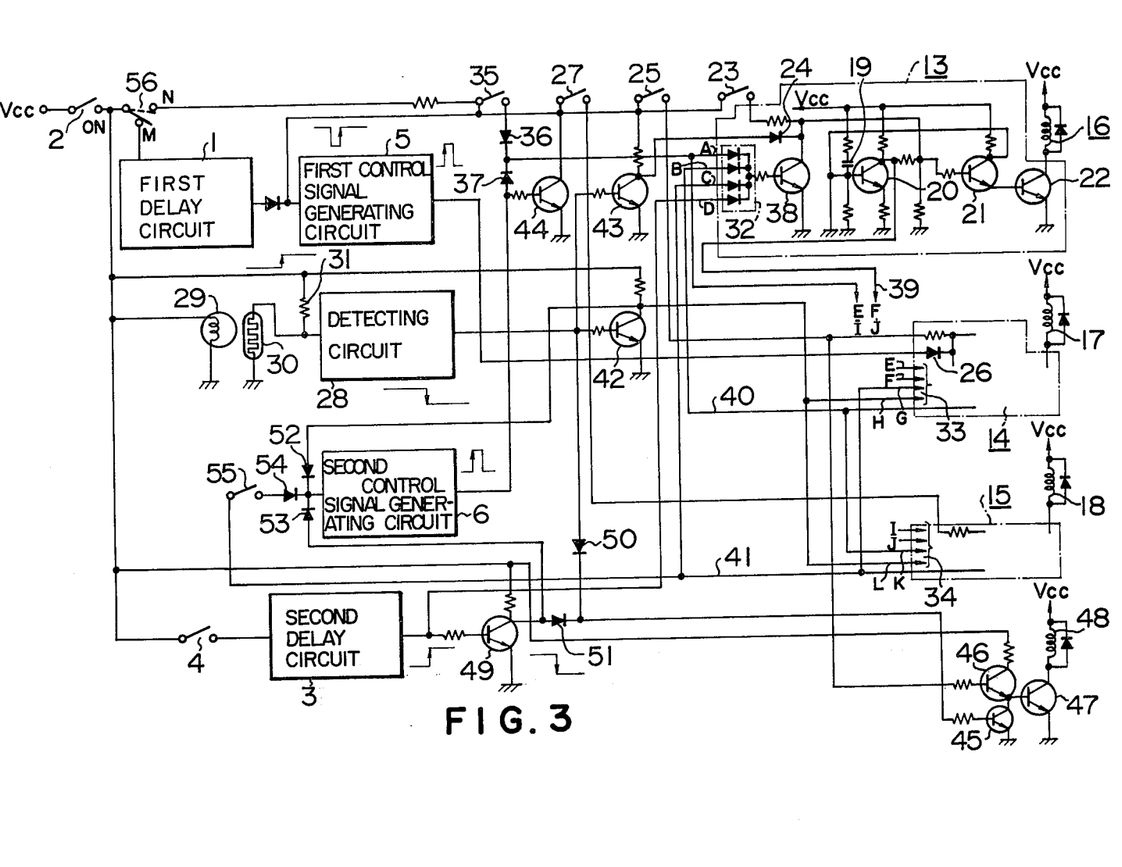
FIG. 3 is a schematic drawing showing an electric circuit in a magnetic recording and reproducing system embodying the invention.

FIG. 3 shows an electric circuit for the magnetic recording and reproducing system according to the invention. Referring to the Figure, reference numeral 1 designates a first delay circuit for delaying a voltage $V_{cc}$ appearing through a switch 2 adapted to be closed by loading the cartridge. Its output appears after a delay time from the commencement of paying-off of the leader tape till the passing of the leading end of the magnetic tape by the pinch roller. In this embodiment, this delay time is set to be about 5 seconds. Numeral 3 designates a second delay circuit for delaying a voltage $V_{cc}$ appearing through a switch 4 adapted to be closed upon detection of the leader tape in the rewind state, that is, when the indication of a tape feed extent indicator, the indication being proportional to the tape feed extent, is reduced back to zero. A slight delay time, of about 1 second, is required from the instant when the magnetic tape is completely rewound until the tape run in the rewind state is in order for the leader tape to be also completely rewound into the cartridge. Numeral 5 designates a first control signal generating circuit to produce a pulse signal with a duration of about 1 second as a control signal for automatically bringing about the playback state or automatically ejecting the cartridge. Numeral 6 designates a second control signal generating circuit to produce a pluse signal with a duration of about 1 second as a control signal for automatically stopping the tape drive.

Figure 4:
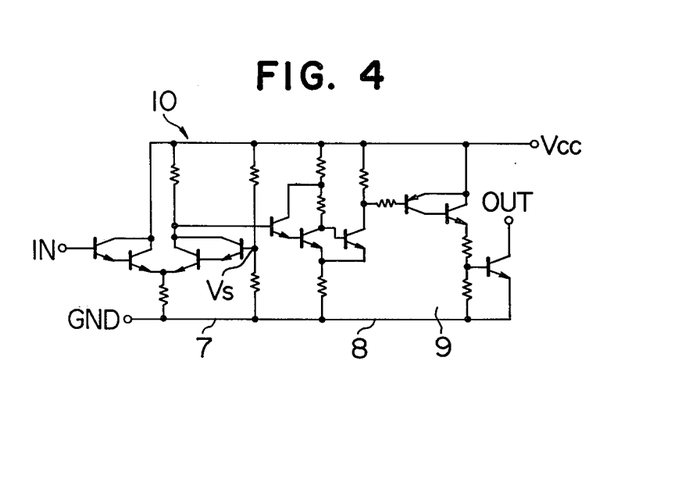
FIGS. 4 to 6 are circuit diagrams showing circuit constructions of some parts in the circuitry of FIG. 3.
Figure 5:
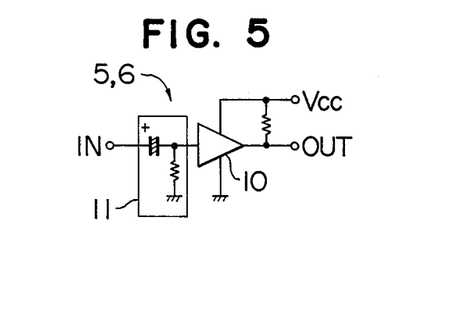
Figure 6:
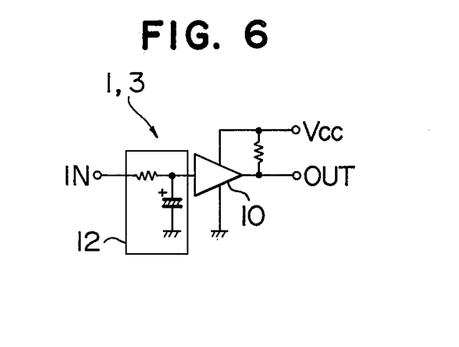
Figure 7:
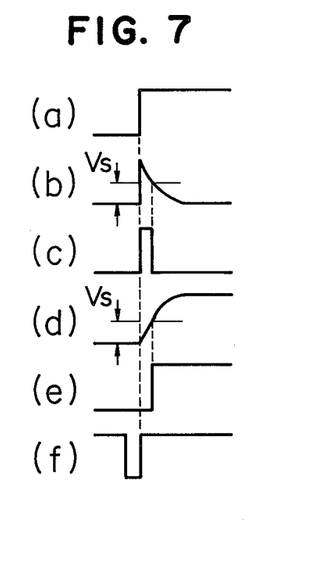
FIGS. 7(a) to 7(f) show waveforms involved in the operation of the circuit of FIG. 3.

FIG. 4 shows the essential part of the circuit construction constituting the first and second delay circuits 1 and 3 and first and second control signal generating circuits 5 and 6. It has the form of an integrated circuit generally designated at 10, comprising a differential amplifier section 7, a Schmitt circuit section 8 and a drive circuit section 9. The control signal generating circuit 5 or 6 may be constructed by connecting a differentiating circuit 11 to the input terminal of the circuit 10, as shown in FIG. 5. The delay circuit 1 or 3 may be constructed by connecting an integrating circuit 12 to the input terminal of the circuit 10, as shown in FIG. 6. When a step voltage as shown at (a) in FIG. 7 is added to the input terminal of the differentiating circuit 11, a differential signal as shown at (b) is obtained at the input terminal of the circuit 10, so that a control signal (c) is generated in the form of a pulse of voltage $V_{cc}$ and with a duration corresponding to a portion of the differential signal above a reference voltage $V_s$ preset with the differential amplifier section 7. On the other hand, when the step voltage (a) is added to the integrating circuit 12, an integral signal as shown at (d) is obtained at the input terminal of the associated circuit 10, so that a delayed signal (e) delayed after the input signal (a) is obtained when the reference voltage $V_s$ is surpassed by the integral signal. The pulse width of the control signal (c) and the delay time of the delayed signal (e) may be suitably preset by appropriately selecting the time constant of the differentiating circuit 11 and integrating circuit 12.

Numerals 13 to 15 designate respective hold circuits for holding the drive voltage for driving associated solenoids. In this embodiment, the hold circuit 13 is provided for driving a rewind solenoid 16, the hold circuit 14 for a playback solenoid 17, and the hold circuit 15 for a fast feed solenoid 18.

The operation of these hold circuits 13 to 15 will now be described. When source voltage $V_{cc}$ is switched on, a transistor 20 is triggered with the charging of a capacitor 19, so that a transistor 21 and a driving transistor 22 remain "off". In this state, the rewind solenoid 16 is not energized. By subsequently closing a manual switch 23 for rewinding or upon subsequent coupling of a control signal through a diode 24 to the base of the transistor 21, the transistors 21 and 22 are triggered to energize the rewind solenoid 16. Simultaneously, the transistor 20 is cut off, so that the output of the transistor 20 is held at a high voltage level sufficient to hold the transistor 21 "on". In this way, the rewind solenoid 16 is held energized. Likewise, by closing a manual switch 25 for playback or upon coupling of a control signal to a diode 26 in the hold circuit 14, the playback solenoid 17 is rendered operative. Also, by closing a manual switch 27 for fast feeding the fast feed solenoid 18 is rendered operative by the hold circuit 15.

Numeral 28 designates a detecting circuit. Numeral 29 designates a lamp, and numeral 30 a photoelectric converting element such as CDS. They are provided such that they face each other on opposite sides of the path of tape travel. The element 30 constitutes a voltage divider together with a resistor 31. The photoelectric converting element 30 provides a high resistance when the magnetic tape is present between it and the lamp, while it provides a low resistance when light of the lamp 29 is transmitted through the transparent tape and falls upon it. The input to the detecting circuit 28, that is, the output of the voltage divider, is adapted to be higher than a reference voltage $V_s$ when the resistance of the element 30 is high and lower than the reference voltage when the resistance of the element is low. Thus, the detecting circuit 28 can be set such that its output undergoes a change from high voltage level $V_{cc}$ to low level (zero volt) at an instant when the nontransparent magnetic tape passing by the photoelectric converting element 30 is replaced with the transparent leader tape or trailer tape.

The hold circuits 13 to 15 are reset by an input coupled to their respective diode input sections 32 to 34.

When a stop signal from a manual stop switch 35 is added through a diode 36 to an input terminal A in the diode input section 32 or when the output of the second control signal generating circuit 6 is coupled as a stop signal through a diode 37 to the input terminal A, a transistor 38 is triggered to cut off the transistor 21, thus triggering the transistor 20. As a result, the hold circuit 13 is reset to deenergize the rewind solenoid, whereby the tape is stopped. This stop signal also goes to an input terminal E in the diode input section 33 and an input terminal I in the diode input section 34 to cause similar action of the hold circuits 14 and 15. The hold output voltage 39 from the hold circuit 13 is added to input terminals F and J in the respective diode input sections 33 and 34 for resetting the other hold circuits 14 and 15. Likewise, output voltage 40 from the hold circuit 14 is added to input terminals B and K in the respective diode input sections 32 and 34, and output voltage 41 from the hold circuit 15 is added to input terminals C and G in the respective diode input sections 32 and 33. When the output of the delay circuit 3 goes to an input terminal D in the diode input section 32, the rewinding is prohibited for effecting the ejection of the cartridge. When the output of a transistor 42 inverting the output of the detecting circuit 28 is added to an input terminal H or L in the diode input section 33 or 34 as a result of the detection of the transparent trailer tape trailing the magnetic tape, the playback or fast feeding is prohibited. A transistor 43 serves to invert the output of the detecting circuit 28 so as to produce a control signal added to a diode 24 in the hold circuit 13 for automatically causing the rewinding. A transistor 44 serves such that it is cut off for about 1 second by a control signal (with a duration of about 1 second) from the second control signal generating circuit 6. When the transistor 44 is triggered again after 1 second, the first control signal 5 is actuated to produce a control signal for automatically causing playback or ejection of the cartridge. This control signal causes either the playback state or ejection of the cartridge depending upon the output of the detecting circuit 28. In the presence of the magnetic tape at the detecting section, the output of the detecting circuit 28 is at a high voltage level to hold a transistor 45 on. In this state, even if the control signal is added to the base of a transistor 46, a transistor 47 remains off since the transistor 45 is on, so that an eject solenoid 48 is not energized. This solenoid 48 is energized as a result of detection of the transparent tape. In order that the eject solenoid 48 will not be energized as a result of detection of the trailer tape trailing the magnetic tape, the transistor 45 is adapted to be cut off only when the voltage level of the signal going to both diodes 50 and 51 becomes low with the delayed output signal from the second delay circuit 3 inverted through a transistor 49. When the transistor 45 is rendered off in this way, the output of the first control signal generating circuit 5 triggers the transistor 47, thus energizing the eject solenoid 48. The input to the second control signal generating circuit 6 for generating the automatic stop control signal is added through diode 52, 53 or 54. The diode 52 permits a signal from the transistor 42 to invert the output of the detecting circuit 28. Thus, in response to the detection of the transparent trailer tape trailing the magnetic tape the second control signal generating circuit 6 produces an automatic stop control signal, the control signal being coupled through the diode 37 to the input terminal E in the diode input section 33 and input terminal I in the diode input section 34, thus automatically releasing the playback state or fast feed state and stopping the tape for about 1 second. At the end of the stop period an inverted signal from the transistor 43 is added through the diode 24 to the hold circuit 13 to energize the rewind soleniod 16, thus automatically bringing about the rewind state. The diode 53 conducts a signal produced when the switch 4 is closed upon detection of the completion of rewinding of the magnetic tape. In response to the closure of the switch 4 the second delay circuit 3 produces, after a delay time required for fully rewinding the leader tape into the cartridge, an output inverted by the transistor 49 to produce the signal added to the second control signal generating circuit 6, causing the circuit 6 to produce a control signal for releasing the rewind state and stopping the tape for about 1 second. By this control signal, the transistor 44 is also cut off for about 1 second, so that a voltage as shown at (f) in FIG. 7 is supplied to the first control signal generating circuit 5, which thus produces a control signal with a duration of about one second to serve this time as an automatic eject control signal. Although the output of the first control signal generating circuit 5 is also coupled as an automatic playback control signal to the hold circuit 14, this time a signal from the transistor 42 inverting the output of the detecting circuit 28 prevails at the input terminal H of the diode input section 33 and the input terminal L of the diode input section 34 due to the presence of the leader tape at the detecting section, prohibiting the playback and fast feed, so that the cartridge is automatically ejected.

The diode 54 conducts a signal appearing from an indicator switch 55 upon closure thereof. The indicator switch 55 is provided in an indicator for indicating the extent of tape feed. The indicator can be preset to a desired tape feed extent position, so that the switch 55 will be closed upon reaching the preset position, producing a signal coupled through the diode 54 to the second control signal generating circuit 6 for rendering the transistor 44 off for about 1 second. As a result, the first control signal generating circuit 5 produces a control signal serving this time as an automatic playback control signal coupled to the diode 26 in the hold circuit 14, thus energizing the playback solenoid 17 to automatically cause playback. In effecting the automatic playback from a desired tape position (or so-called cutting-in) with the indicator switch 55, the tape is preferably fast fed up to the preset position. To this end, that is, to achieve cutting-in right after the fast feeding, the hold output 41 of the hold circuit 15 is supplied to the switch 55 since during the normal playback there is no need of stopping the tape.

Numeral 56 designates a switch with its pole held in contact with contact M during the loading period, during which the leader tape is paid off. During this period, the voltage output of the switch 2 closed by loading the cartridge is supplied to the input terminal of the first delay circuit 1, and with the rising of the signal appearing from the delay circuit 1 after a delay time of about 5 seconds the first control signal generating circuit 5 is actuated to produce an automatic playback control signal added to the hold circuit 14 so as to energize the playback solenoid 17 for automatically causing playback. As mentioned earlier, the delay time here corresponds to a time interval from the commencement of paying-off of the leader tape till the passing of the leading end of the magnetic tape by the pinch roller. As soon as the playback solenoid is energized, the feed roller for loading the leader tape is decoupled to release the intial loading state. At this time, the pole of the switch 56 is switched over to the side of contact N, thus switching the source voltage $V_{cc}$ over to the line leading to the manual switches 23, 25, 27 and 35.

While the operation of various parts of the electric circuit for the tape drive control has been described in the foregoing, the tape drive control will now be reviewed in a sequential way. By loading the cartridge the switch 2 is closed. At the same time, the switch 56 is thrown to the side of its contact M, thus bringing about the loading state to pay off the leader tape. At the end of the paying-off of the leader tape, the first delay circuit 1 produces an output. With this output the first control signal generating circuit 5 is actuated to deliver a control signal of a duration of about 1 second to the hold circuit 14, thus energizing the playback solenoid 17 to automatically render the tape drive into the playback state while simultaneously releasing the loading state. When the transparent trailer tape trailing the magnetic tape is detected, the detection circuit 28 produces a detection signal, causing the second control signal generating circuit 6 to produce a control signal for stopping the tape for about 1 second. At the end of the stop period an inverted signal from the transistor 43 is given to the hold circuit 13, thus energizing the rewind solenoid 16 to automatically bring about the rewind state. When the transparent leader tape provided at the leading end of the magnetic tape is detected, at which time the indication of the tape feed extent is reduced back to zero, the switch 4 is actuated, and at delay time of about 1 second thereafter the second delay circuit 3 causes the second control signal generating circuit 6 to produce a control signal for stopping the tape for about 1 second. At the end of this stop period, a control signal produced from the first control signal generating circuit 5 is coupled to the transistor 46 to trigger the transistors 46 and 47, thus energizing the eject solenoid 48. Thus, after the tape is automatically stopped, the cartridge is automatically ejected.

As has been shown, with the magnetic recording and reproducing system embodying the invention the tape drive can be controlled entirely automatically without any manual operation, with the leader tape leading the magnetic tape automatically beginning to be paid off by merely loading the cartridge, the playback state automatically setting in when the leading end of the magnetic tape passes between the pinch roller and capstan, the tape being automatically stopped upon detection of the trailer tape trailing the magnetic tape, the rewind state being subsequently brought about automatically, and the tape being again automatically stopped upon completion of rewinding of the leader tape into the cartridge, which is subsequently ejected automatically.

Of course, it is also possible to control the tape drive manually. Further, even when the playback state or fast feed state is caused manually, the tape can be automatically stopped upon detection of the trailing end of the magnetic tape, followed by the setting-in of the rewind state.

Furthermore, it is possible to achieve the so-called cutting-in automatically, that is, automatically switching the fast feed state into the playback state upon reaching of a tape position preset by the tape feed extent indicator.

Since the commencement of the feeding of the tape from the cartridge, recording or playback, stopping of the tape, rewinding and ejection of the cartridge can all be effected under automatic control, the magnetic recording and reproducing system according to the invention features the most excellent operability.

Figure 8:
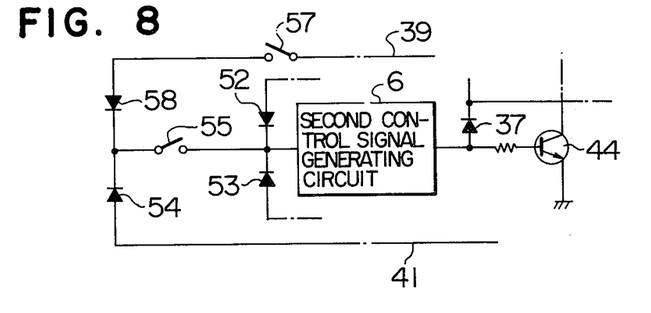
FIG. 8 is a circuit diagram showing part of the control circuit for effecting the repeating of reproduction.

The invention also intends to provide such recording and reproducing apparatus with means for automatically repeating the reproduction of a tape portion from a predetermined position thereof to the trailing end thereof. FIG. 8 shows part of the electric circuit in another embodiment of the invention. In the Figure the same parts as those in FIG. 3 are designated by like reference numerals, and they are not described here. In this embodiment, the automatic repeating function is provided by a repeat switch 57 and a diode 58, these parts being added to the tape drive control system shown in FIG. 3. The repeat switch 57 is inserted between the hold output terminal 39 of the hold circuit 13 and the diode 58, which is in turn connected to the switch 55. The indicator switch 55 acts such that it is turned on upon the reaching of a preset extent of the tape feed reached in the presence of the hold output 41 of the hold circuit 15 in the fast feed state, whereupon the second control signal generating circuit 6 is actuated to cut off the transistor 44 for about 1 second and cause the first control signal generating circuit 5 to produce an automatic playback control signal so as to switch the tape run into the playback state. With subsequent detection of the trailing end of the magnetic tape the rewind state is brought about in the manner as mentioned earlier. If the repeat switch 57 is on at this time, the rewind hold output 39 is applied through the diode 58 to the indicator switch 55. Then, when the indicator switch 55 is closed upon reaching the tape position corresponding to the preset tape feed extent, the playback state automatically is set in the same way as from the fast feed state. It will be understood that by holding the repeat switch on it is possible to automatically repeat the playback of a tape portion between a tape position corresponding to the preset tape feed extent and the trailing end of the magnetic tape in the order of fast prefeeding till the reaching of the present tape feed extent position, playback (cutting-in) from that position, detection of the trailing end of the magnetic tape, rewinding back to that position and playback from that position again. By opening the repeat switch 57 the normal automatic tape drive control as mentioned earlier in connection with the first embodiment may be obtained.

As has been shown, according to the invention it is possible to automatically repeat the playback of a tape portion from a preset tape feed extent position to the trailing end of the magnetic tape.

Figure 9:
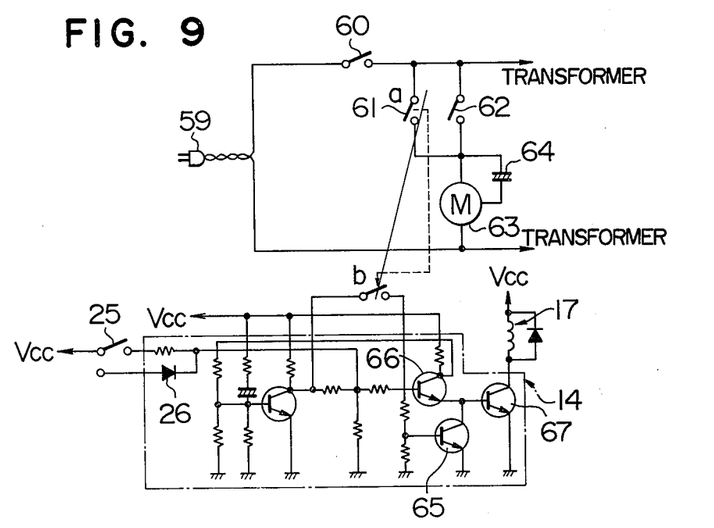
FIG. 9 is a circuit diagram showing part of the control circuit and part of the controlled circuit operated when effecting the still reproduction.

FIG. 9 shows a further embodiment of the invention, which permits still reproduction. Numeral 59 designates a power source plug. Its one lead is led to the earth side of a motor 63 and a source power transformer, while its other lead is led through a power switch 60 to switches 61 and 62 and to the hot side of the source power transformer. The switch 61 is provided for the still reproduction, and it has ganged switches *a* and *b*. When the power switch 60 and either switch 61 or 62 are closed, the circuit of motor 63 and motor drive phase advancement capacitor 64 is connected across the power source, so that the motor is driven. The switch 62 is interlocked to the tape drive mechanism such that it is on when the tape is moving, that is, during the loading immediately after the loading of the cartridge, fast feeding, playback and rewinding. When the playback solenoid 17 is energized by closing the manual switch 25 for playback or with a control signal given to the hold circuit 14, the switch 62 is closed to start the motor 63, thus bringing about the playback state. When the switch 61 for still reproduction is closed in this state, the playback hold output 40 triggers transistor 64 to shunt the output of transistor 66, thus cutting off transistor 67 to de-energize the playback solenoid 17 so as to stop the tape, so that the switch 62 is opened. With the stopping of the tape, however, the motor continues to be driven so long as the switch 61 for the still reproduction is closed, so that the still reproduction is obtained. By opening the switch 61 the transistor 65 is cut off to trigger the transistors 66 and 67 with the hold output, thus re-energizing the playback solenoid 17 to resume the playback state. At the time of the ordinary stopping due to the closure of the manual stop switch or due to the appearance of the automatic stop control signal, the switch 61 for the still reproduction is off, so that both tape and motor are stopped with the opening of the switch 62.

Figure 10:
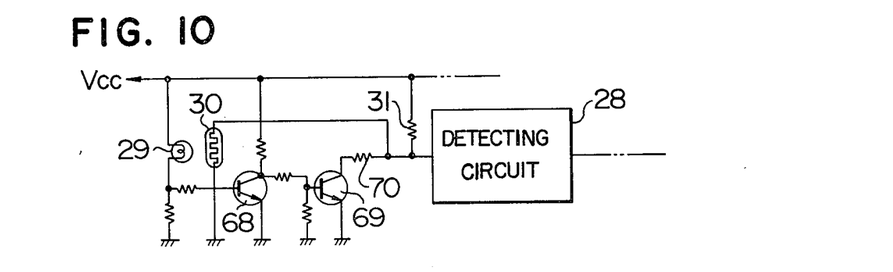
FIG. 10 shows an example of the circuit for detecting the breakage of a tape progress detection lamp.

FIG. 10 shows a main circuit part of one practical embodiment of this invention.

The same parts as described-above are denoted as the same numbers as shown in FIG. 3, and their explanations are omitted.

In FIG. 10, in the normal state that the lamp 29 is conductive, a current flowing through the lamp 29 turns a transistor 68 on and a transistor 69 off. Accordingly, a resistor 70 is in the open state and a voltage $V_{cc}$ is divided by the resistor 31 and the photoresistance of the photoelectric converting element 30. When the magnetic tape changes to a trailer tape part the light of the lamp illuminates the photoelectric converting element 30, and the resistance thereof is decreased. It is necessary to set the value of the resistor 70 almost at this low resistance value. As the current flowing through the lamp 29 is cut off when the lamp 29 happens to be broken, the transistor 68 turns off and accordingly the transistor 69 turns on. As the lamp 29 is broken, the photoresistance of the photoelectric converting element 30 is high, and the voltage $V_{cc}$ is divided by the resistor 31 and a resistor 70. As the resistance value of the resistor 70 is selected to be nearly equal to the resistance value in the case that the photoelectric converting element 30 is illuminated, the resistance value is set nearly equal to that in the photo detecting circuit when the lamp is broken. That is, when the lamp 29 happens to be broken, the detecting circuit 28 is operated and consequently the transistors 42, 43 are operated to protect the tape from overrunning and uncertainty of automatic stopping by converting tape running to automatic stopping and automatic rewinding states at once.

As has been shown, according to the invention while both the tape and drive motor are stopped at the time of the ordinary stopping of the tape, only when the switch for the still reproduction is on only the drive motor can be driven with the tape held still for effecting the still reproduction. Thus, the magnetic tape will not be damaged by the rotary head. Also, the still reproduction state can be switched from the normal playback state at any time by merely closing the still reproduction switch, so that any desired frame can be reproduced as a still picture. Further, by opening the still reproduction switch the normal playback of the following frames can be promptly resumed. Furthermore, with the still reproduction switch it is possible to realize consecutive still reproduction of frames very close to one another, and also there is no need of manually rotating the reel in the neighborhood of the noise band.

What we claim is:

1. A magnetic recording and reproducing system using a cartridge housing a reel on which is wound a magnetic tape having a transparent leader tape joined at a leading end thereof and a transparent trailing tape joined at a trailing end thereof, comprising:
   a. cartridge holding means for mounting said cartridge for movement between an operative position and an inoperative position on the system and including an ejection means having an ejecting solenoid (48) for moving said cartridge from the operative position to the inoperative position;
   b. a take-up reel provided on the system;
   c. loading means including a pinch roller for transporting the tape over a travel path from said cartridge to said take-up reel responsive to the movement of said cartridge to the operative position;
   d. first delay means (1) for producing an output voltage signal after a delay time corresponding to the time the leader tape is transported from said cartridge by said loading means to the time the magnetic tape passes through the pinch roller;
   e. a first control circuit means (43) for inverting an input signal;
   f. first switching means (56) for applying a supply voltage to said first control circuit means (43) through said first delay means when the tape is transported by said loading means and directly to said first control circuit means (43) when the tape is not transported by said loading means;
   g. first and second pulse generating means (5, 6) each generating a pulse at the beginning of a voltage signal applied to their inputs;
   h. means for applying the output voltage signal of said first delay means (1) to the input of said first pulse generating means (5);
   i. a rewinding solenoid (16), a playback soleniod (17) and a fast feed solenoid (18) each including a holding circuit means (13, 14, 15) for energizing the respective solenoid and having a set terminal and a reset terminal wherein once an input signal is supplied to the set terminal, a fixed state of the set terminal is maintained energizing the respective solenoid until a next signal is supplied to the reset terminal, and when one of the holding circuit means is set, the others are reset;
   j. a tape rewinding means activated by said rewinding solenoid (16);
   k. a playback means activated by said playback solenoid (17);
   l. a tape fast feed means activated by said fast feed solenoid (18);
   m. means for supplying the pulse of said first pulse generating means (5) to the set terminal of the holding circuit means of said playback solenoid (17);
   n. first detecting means (29, 30) arranged in the travel path of said magnetic tape for detecting the presence and absence of said magnetic tape and generating an output signal in the absence of said magnetic tape;
   o. means for passing the output signal of said first detecting means to the reset terminal of said holding circuit means of said playback solenoid and said fast feed solenoid, and as the input signal to said first control circuit means, said control circuit means including means for applying the inverted signal to the set terminal of said holding circuit means of said rewind solenoid;
   p. means for applying said output signal of said first detecting means (29, 30) as the voltage signal applied to the input of said second pulse generating means (6);
   q. means for applying the pulse of said second pulse generating means (6) to the reset terminals of all of said holding circuit means (13, 14, 15);
   r. tape end second detecting means (4), including an indicator scale means which increases depending on the quantity of tape feed and decreases depending on the quantity of tape rewind, for providing an output signal at the zero point of said indicator scale means;

s. a second delay means (3) for delaying said output signal of said tape end detecting means and providing an output signal;

t. means for applying the output signal of said second delay means to the reset terminal of said holding circuit means of said rewind solenoid;

u. means (45, 46) for ANDing the output signals of said second delay means, said first detecting means and the pulse of said first pulse generating means and providing an output signal; and v. means for energizing the ejecting solenoid (48) in response to the ouput signal of said ANDing means.

2. A magnetic recording and reproducing system according to claim 1, wherein said first detecting means comprises a lamp (29) and a photoelectric converting element (30) which are arranged opposite each other on opposite sides of the travel path of said magnetic tape, and further comprising:

third means (68) for detecting disconnection of the lamp (29) from the system, and means (69), responsive to said third detecting means, for generating a detecting output signal when said lamp is disconnected.

3. A magnetic recording and reproducing system according to claim 1, further comprising:

third detecting means (55) for generating an output signal at a predetermined scale position of said indicator scale means;

means for applying said output signal of said third detecting means to said second pulse generating means, and control means responsive to the pulse generated by said second pulse generating means (6) for applying a voltage signal to the input of said first pulse generating means (5) so that a pulse may be generated by said first pulse generating means (5).

4. A magnetic recording and reproducing system according to claim 3, wherein said second detecting means generates an output at a predetermined scale position of said indicator scale during a hold state of said holding circuit of said fast feed solenoid.

5. A magnetic recording and reproducing system according to claim 3 wherein said second detecting means generates an output at a predetermined scale position of said indicator scale during a hold state of said holding circuit of said rewind solenoid.

6. A magnetic recording and reproducing system according to claim 3 wherein said second detecting means generates an output at a predetermined scale position of said indicator scale during a hold state of either one of said holding circuits of said rewind and fast feed solenoids.

* * * * *